Patent text …

3,284,445
α-SUBSTITUTED-1-ADAMANTYLMETHYL
PENICILLINS
Edward C. Hermann, Newark, and Jack A. Snyder, Claymont, Del., assignors to E. I. du Pont de Nemours and Company, Wilmington, Del., a corporation of Delaware
No Drawing. Filed Nov. 17, 1964, Ser. No. 411,689
4 Claims. (Cl. 260—239.1)

This invention relates to synthetic pencillins having the 1-adamantylmethyl side chain.

The 1-adamantylmethyl penicillins within the scope of this invention are represented by the following formula:

(1)

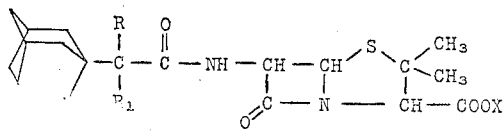

wherein R and $R_1$ are hydrogen or methyl; and X is hydrogen or a non-toxic anion.

The compounds of Formula 1 are synthetic penicillins. "Riegel's Industrial Chemistry," Editor James A. Kent, Reinhold Publishing Corporation, New York, N.Y., 1962, p. 204, discusses the importance of synthetic penicillins.

Economical methods have recently been found for removing the phenylacetyl side chain from penicillin G, leaving intact the nucleus, 6-aminopenicillanic acid. A large number of "synthetic penicillins" have been made by chemically coupling new side chains in the hopes of altering the range of therapeutic usefulness of the fundamental unit. Such improvements include resistance to penicillinase (an enzyme found in penicillin-resistance Staphylococci) which inactivates the compound by opening the β-lactam ring. Others include enhanced activity against gram-negative bacteria.

We have found that the use of an adamantylmethyl side chain having one or two methyl groups on the methyl carbon or no substitution on the methyl carbon gives synthetic penicillins which exhibit an unexpected improvement in decreased acid-sensitivity and greater resistance to penicillinase than is found in known synthetic penicillins. Particularly, preferred compounds of the invention due to their outstanding stability are those in which one or both hydrogens of the adamantylmethyl side chain are substituted with methyl groups, namely, α-methyl-1-adamantylmethyl penicillin and α,α-dimethyl-1-adamantylmethyl penicillin.

This invention embraces the non-toxic salts of the basic penicillin structure of Formula 1 when X is hydrogen. Forming the salt enhances the usefulness of the basic penicillin structure by giving improved water-solubility and by improving acid stability due to the alkaline character of the salt. The two most preferred salts are sodium and potassium salts. Representative of these salts are:

Sodium 1-adamantylmethyl penicillin
Potassium 1-adamantylmethyl penicillin
Sodiam α-methyl-1-adamantylmethyl penicillin
Potassium α-methyl-1-adamantylmethyl penicillin
Sodium α,α-dimethyl-1-adamantylmethyl penicillin
Potassium α,α-dimethyl-1-adamantylmethyl penicillin However, it is to be understood that other salts of the basic penicillin strucure of the invention which utilize a non-toxic anion are also included within the compound scope of the invention. Illustrative of such other salts are the salts with organic bases such as procaine, chloroprocaine, hydrabamine [N,N-bis-(dehydroabietyl)ethylenediamine].

The penicillins of this invention are prepared by the reaction of the appropriate acid chloride with 6-aminopenicillanic acid (commercially available) in chloroform containing triethylamine at 0 to 25° C. After reaction, the triethylamine is removed by treatment with dilute acid, and the penicillin is extracted into aqueous sodium bicarbonate. Removal of the water at low temperature and pressure gives the sodium 1-adamantylmethyl penicillin. This may be purified by recrystallization in some cases, and in many cases the product is sufficiently pure to be used directly. Use of aqueous potassium bicarbonate gives the potassium salts. Neutralization with acid gives the acid forms. These may be treated with an organic base in aqueous solution or organic solvents to yield the organic base salts.

The preparation of the three 1-adamantylacetic acids and their acid chlorides is discussed fully in the following specific examples of the synthesis of the compounds of this invention.

EXAMPLE 1

Sodium 1-adamantylmethyl penicillin

A mixture of 0.10 mole of 11-adamantaneacetic acid (H. Stetter, M. Schwarz and A. Hirschorn, Ber., 92, 1629 (1959) and 60 ml. of thionyl chloride is refluxed for 2.5 hours. The excess thionyl chloride is removed by vacuum concentration and the residue is vacuum-distilled to give 1-adamantaneacetyl chloride.

A solution of 10.88 g. (0.0492 mole) of 6-aminopenicillanic acid and 0.0984 mole of triethylamine in 66 ml. of chloroform in a 300-ml. round-bottom flask fitted with a stirrer, a thermometer and a dropping funnel is stirred and cooled to 0° C., using an ice-salt bath. With stirring, a solution of 0.0492 mole of 1-adamantaneacetyl chloride in 66 ml. of chloroform is added dropwise at such a rate that the temperature does not rise above 0° C. This takes about 15 minutes. The cooling bath is removed and the mixture is stirred for two hours, gradually warming to room temperature during this time. Then, it is again cooled to 0° C. and transferred to a separatory funnel. It is extracted with 49 ml. of cold 1 N hydrochloric acid. The chloroform layer is then extracted with 49 ml. of 1.00 N sodium bicarbonate. The sodium bicarbonate extract is concentrated in a vacuum at a temperature below 35° C. to yield sodium 1-adamantylmethyl penicillin as the residue. If, after extractting with the 1 N hydrochloric acid, the chloroform layer is concentrated in a vacuum at low temperature, the residue is mainly 1-adamantylmethyl penicillin.

EXAMPLE 2

Sodium α-methyl-1-adamantylmethyl penicillin

A mixture of 0.10 mole of 1-adamantyl methyl ketone (H. Stetter and P. Goebel, Ber., 95, 1039 (1962); H. Stetter and E. Rauscher, Ber., 93, 2054 (1960) and 75 ml. of ether is added dropwise to a suspension of 0.05 mole of lithium aluminum hydride in 150 ml. of ether. The reaction mixture is refluxed for an hour after addition is complete. Then, the excess lithium aluminum hydride is decomposed with saturated aqueous sodium sulfate, the solids are removed by filtration, and the filtrate is vacuum-concentrated to remove ether and water. The residue is α-methyl-1-adamantanemethanol.

A mixture of 0.32 mole of α-methyl-1-adamantanemethanol, 3 ml. of concentrated hydrochloric acid, 15 ml. of water, 5 g. of nickel chloride hexahydrate and 17 g. of nickel carbonyl is placed in a glass-lined autoclave. The autoclave is pressured to 900 p.s.i.g. with carbon monoxide and then heated at 275–300° C. for 24 hours. It is then cooled, vented, and its contents are extracted with ether. The ether extract is evaporated and the residue is neutralized with 10% sodium hydroxide solution. This mixture is extracted with ether, and the ether extract is discarded. The aqueous layer is made strongly acidic with conc. hydrochloric acid and extracted with ether. The ether extract is dried with anhydrous magnesium sulfate, and then evaporated to yield a residue of α-methyl-1-adamantaneacetic acid.

A mixture of 0.10 mole of α-methyl-1-adamantaneacetic acid and 65 ml. of thionyl chloride is refluxed for 2 hours. Then, the excess thionyl chloride is removed by vacuum distillation, and the residue is vacuum-distilled to yield α-methyl-1-adamantaneacetyl chloride.

The procedure of Example 1 is repeated, using 0.0492 mole of α-methyl-1-adamantaneacetyl chloride in place of the 0.0492 mole of 1-adamantaneacetyl chloride. Sodium α-methyl-1-adamantylmethyl penicillin is obtained. If 49 ml. of 1.00 N potassium bicarbonate is substituted for the 49 ml. of 1.00 N sodium bicarbonate, potassium α-methyl-1-adamantylmethyl penicillin is obtained.

EXAMPLE 3

Sodium α,α-dimethyl-1-adamantylmethyl penicillin

To a solution of 31.5 g. of 1-adamantoyl chloride in 500 ml. of anhydrous ether under a nitrogen atmosphere is added, dropwise 150 ml. of commercial 3 M methyl magnesium bromide at a rate which maintains a gentle reflux. The reaction mixture is heated for 1 hour after the addition, then cooled. To decompose the metal complex, 300 ml. of saturated ammonium chloride is added. The ether layer is separated and the aqueous layer is extracted with 100 ml. of chloroform. This extract is combined with the ether layer, and the mixture is dried with anhydrous magnesium suflate and vacuum-concentrated to dryness at 35° C. The residue is steam-distilled until the distillate is no longer milky, about 3 liters of distillate being collected. On cooling, the steam distillate crystallizes. The solids are filtered and dried to yield 26.9 g. of α,α-dimethyl-1-adamantanemethanol, M.P. 77–80° C.

A suspension of 25 g. of α,α-dimethyl-1-adamantanemethanol in 100 ml. of 98% formic acid is added to a mixture of 600 ml. of conc. sulfuric acid and 400 ml. of carbon tetrachloride. One hour after the addition is complete, the reaction mixture is poured on 1000 g. of ice. The organic layer is separated, and the aqueous layer is washed with carbon tetrachloride. The carbon tetrachloride extract and the organic layer are combined and extracted with 10% sodium hydroxide solution. The aqueous layer is separated and then made strongly acidic with conc. hydrochloric acid. This mixture is extracted with ether, and the ether extract is dried with anhydrous magnesium sulfate and concentrated in a vacuum. The residue is a syrup, which crystallizes on cooling to yield 14.3 g. of α,α-dimethyl-1-adamantaneacetic acid melting at 75–78° C.

A mixture of 14 g. of α,α-dimethyl-1-adamantaneacetic acid and 60 ml. of thionyl chloride is refluxed for 3 hours. The excess thionyl chloride is removed by distillation and the residue is vacuum-distilled to yield α,α-dimethyl-1-adamantaneacetyl chloride.

The procedure of Example 1 is repeated, using 0.0492 mole of α,α-dimethyl-1-adamantaneacetyl chloride in place of the 0.0492 mole of 1-adamantaneacetyl chloride. Sodium α,α-dimethyl-1-adamantylmethyl penicillin is obtained.

The compounds of the present invention exhibit the utility known for synthetic penicillins generally and, therefore, find use for treatment of bacterial diseases. In particular, these compounds show activity against Pneumococci, Streptococci, and Staphylococci. In addition, these compounds are useful in the treatment of gram-negative organisms and can be used against organisms usually resistant to non-synthetic penicillins.

The compounds of the invention can be administered for the treatment of bacterial diseases by any means that effects contact of the compound with the organism to be controlled. Preferably administration is accomplished orally or intramuscularly.

The dosage administered will be dependent on the organism being treated as well as the age, health, and weight of the recipient, the nature of the effect desired, and the kind of concurrent treatment, if any. Generally, however, for an adult the dosage will be in the range of about 1–6 grams per day. For a child, the dosage usually will be in the range of about 40–120 milligrams per kilogram of body weight per day.

The dosage form for administration of the compounds, of course, will vary depending on the route of administration employed. For oral administration, these compounds can be employed in useful compositions in such dosage forms as tablets, capsules, powder packets, liquid solutions, liquid suspensions, or elixirs. In such compositions, the active compound will ordinarily be present in an amount of at least 0.5% by weight based on the total weight of the composition and not more than 90% by weight. For intramuscular administration, these active compounds can be employed in sterile solutions, preferably a saline solution. These solutions will ordinarily contain from about 0.5% to 25% and preferably about 1 to 10% by weight of the active compound.

Besides the active compound of the invention, these compositions used as dosage forms will contain solid or liquid non-toxic pharmaceutical carriers for the active compound. Suitable pharmaceutical carriers are described in "Remington's Practice of Pharmacy" by E. W. Martin and E. F. Cook, a well-known reference text in this field.

The disclosure herein should not be taken as a recommendation to use the disclosed invention in any way without full compliance with U.S. Food and Drug Laws and other laws which cover regulations which may be applicable.

Since many different embodiments of the invention may be made without departing from the spirit and scope thereof, it is to be understood that the invention is not limited by the specific illustrations except to the exent defined in the following claims.

What is claimed is:

1. A compound selected from the group consisting of compounds of the formula

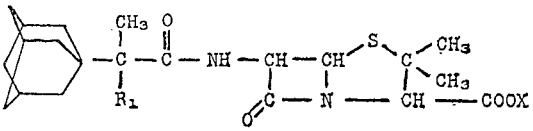

where $R_1$ selected from the group consisting of hydrogen and methyl; and

X is selected from the group consisting of hydrogen and a non-toxic anion.

2. α-Methyl-1-adamantylmethyl penicillin.
3. α,α-Dimethyl-1-adamantylmethyl penicillin.
4. Sodium α,α-dimethyl-1-adamantylmethyl penicillin.

No references cited.

ALEX MAZEL, Primary Examiner.

JAMES W. ADAMS, JR., Assistant Examiner.

UNITED STATES PATENT OFFICE
CERTIFICATE OF CORRECTION

Patent No. 3,284,445                            November 8, 1966

Edward C. Hermann et al.

It is hereby certified that error appears in the above numbered patent requiring correction and that the said Letters Patent should read as corrected below.

Column 1, lines 22 and 68, and column 4, line 64, for "anion", each occurrence, read -- cation --.

Signed and sealed this 12th day of September 1967.

(SEAL)
Attest:

ERNEST W. SWIDER                         EDWARD J. BRENNER
Attesting Officer                            Commissioner of Patents